(12) United States Patent
Choi et al.

(10) Patent No.: US 9,800,821 B2
(45) Date of Patent: Oct. 24, 2017

(54) IMAGE PROCESSING SYSTEM, IMAGE DISPLAY APPARATUS, INTERFACE DEVICE FOR SAVING POWER, ELECTRONIC DEVICE AND DRIVING METHOD OF IMAGE DISPLAY APPARATUS

(71) Applicant: SAMSUNG ELECTRONICS CO., LTD., Suwon-si (KR)

(72) Inventors: Sung-il Choi, Suwon-si (KR); Jeong-kee Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 15/153,891

(22) Filed: May 13, 2016

(65) Prior Publication Data

US 2017/0064243 A1    Mar. 2, 2017

(30) Foreign Application Priority Data

Aug. 24, 2015   (KR) .......................... 10-2015-0118808

(51) Int. Cl.
*H04N 5/63* (2006.01)
*H04N 5/765* (2006.01)
*H04N 5/44* (2011.01)

(52) U.S. Cl.
CPC ................. *H04N 5/63* (2013.01); *H04N 5/44* (2013.01); *H04N 5/765* (2013.01); *H04N 5/4403* (2013.01)

(58) Field of Classification Search
USPC ....... 348/730, 733, 737, 725, 723, 705, 706, 348/664, 571, 333.13, 372, 377, 208.1, 348/208.5, 208.6, 208.16, 133, 87, 739, 348/718, 719, 126; 710/5, 8, 107; 345/95, 98, 210, 634
See application file for complete search history.

(56) References Cited

U.S. PATENT DOCUMENTS

| | | | | |
|---|---|---|---|---|
| 5,574,275 A | * | 11/1996 | Durst | G01C 21/025 250/203.1 |
| 6,163,851 A | * | 12/2000 | Yamazoe | G06F 1/3228 713/100 |
| 2002/0086724 A1 | * | 7/2002 | Miyaki | A63F 13/10 463/9 |
| 2002/0108012 A1 | * | 8/2002 | Olarig | G06F 13/4027 710/306 |
| 2004/0123005 A1 | * | 6/2004 | Stuber | G06F 13/37 710/107 |

(Continued)

*Primary Examiner* — Jefferey F Harold
*Assistant Examiner* — Mustafizur Rahman
(74) *Attorney, Agent, or Firm* — Sughrue Mion, PLLC

(57) ABSTRACT

An image processing system in which an image display apparatus and a peripheral device perform bidirectional communication through a single communication line, including a peripheral device connected to a first side of the communication line, the peripheral device being configured to provide a first signal to the communication line; and an image display apparatus connected to a second side of the communication line, the image display apparatus being configured to provide a second signal to the communication line, and to selectively allow the communication line to conduct electricity based on a state of at least one from among the first signal and the second signal in order to perform the bidirectional communication.

13 Claims, 9 Drawing Sheets

(56) References Cited

U.S. PATENT DOCUMENTS

| | | | |
|---|---|---|---|
| 2006/0066757 A1* | 3/2006 | Numata | H04N 5/60 348/730 |
| 2006/0082690 A1* | 4/2006 | Englert | H04N 5/445 348/731 |
| 2007/0247078 A1* | 10/2007 | Kwon | H02M 1/08 315/200 R |
| 2008/0250161 A1* | 10/2008 | Onozawa | G09G 5/006 710/5 |
| 2009/0086098 A1* | 4/2009 | Onomatsu | H04N 5/63 348/553 |
| 2010/0070783 A1* | 3/2010 | Okamoto | G06F 1/3203 713/310 |
| 2010/0244847 A1* | 9/2010 | Kudo | B60L 3/0046 324/433 |
| 2011/0317078 A1* | 12/2011 | Johns | H04N 21/4432 348/730 |
| 2012/0169579 A1* | 7/2012 | Nishi | G09G 3/3618 345/98 |
| 2012/0320273 A1* | 12/2012 | Toyoda | H04N 5/63 348/730 |
| 2013/0328770 A1* | 12/2013 | Parham | G06F 3/0304 345/157 |
| 2014/0118624 A1* | 5/2014 | Jang | H04N 5/63 348/730 |
| 2014/0222234 A1* | 8/2014 | Hirayama | G06F 1/3234 700/295 |
| 2014/0306722 A1* | 10/2014 | Kim | G06F 3/0416 324/658 |
| 2015/0055663 A1* | 2/2015 | Quinn | H04B 10/801 370/535 |
| 2015/0109535 A1* | 4/2015 | Huang | H04N 21/4432 348/730 |
| 2015/0249862 A1* | 9/2015 | Tao | H04N 21/43632 725/85 |
| 2015/0381173 A1* | 12/2015 | Riad | H03K 19/0005 327/108 |
| 2016/0197490 A1* | 7/2016 | Hirose | H02J 5/005 307/104 |

* cited by examiner

IMAGE PROCESSING SYSTEM, IMAGE DISPLAY APPARATUS, INTERFACE DEVICE FOR SAVING POWER, ELECTRONIC DEVICE AND DRIVING METHOD OF IMAGE DISPLAY APPARATUS

CROSS-REFERENCE TO RELATED APPLICATIONS

This application claims benefit from Korean Patent Application No. 10-2015-0118808, filed on Aug. 24, 2015, in the Korean Intellectual Property Office, the disclosure of which is incorporated herein by reference in its entirety.

BACKGROUND

Field

Apparatuses and methods consistent with the present disclosure relate to an image processing system, an image display apparatus, an electronic device, a power-saving interface device, and a driving method of an image display apparatus, and more particularly, to an image processing system in which, when a sink device such as a digital television (DTV) performs bidirectional communication with a source device such as a Blu-ray disk (BD) player through a single communication line, the two devices can be completely electrically disconnected from each other in an idle state, an image display apparatus, an electronic device, a power-saving interface, and a driving method of an image display apparatus.

Description of Related Art

Data communication methods may be divided into serial communication and parallel communication. A representative example of serial communication is a Universal Serial Bus (USB), a Universal Asynchronous Receiver Transmitter (UART), etc., and a representative example of the parallel communication is IEEE 1284. Serial communication methods may be used in communication between devices which do not require a high transfer rate and are far from each other. Some related-art serial communication methods may require a transmission line and a reception line to be separately installed between two devices to perform bidirectional serial communication. That is, some related-art serial communication methods should have the transmission line and the reception line separately installed to perform bidirectional communication, and use the transmission line only to transmit data and the reception line only to receive data. If a single transmission line is connected between the two devices, the two devices can perform only unidirectional communication.

However, since two transmission lines are necessary for bidirectional communication between two devices in some serial communication, there is a problem that it costs more to install a communication system than when a single transmission line is used. As a result, there is a need for a method for performing bidirectional serial communication using a single transmission line.

Some representative examples of the serial communication are I2C communication and a method using an HDMI CEC line. Herein, the I2C uses two bidirectional open collector lines called serial data (SDA) and serial clock (SCL), which are connected with a pull-up resistor. The HDMI CEC method provides a function of mutually controlling through communication between devices connected to each other through an HDMI cable, and performs bidirectional communication through a CEC line of the $13^{th}$ pin.

However, in some related-art open collector (or drain) structures using a single line such as an I2C line or a CEC line, devices connected to the line are not completely disconnected from each other in a communication idle state and thus there is a problem of power consumption.

SUMMARY

Exemplary embodiments of the present disclosure may overcome the above disadvantages and other disadvantages not described above. The present disclosure is not required to overcome the disadvantages described above, and an exemplary embodiment of the present disclosure may not overcome any of the problems described above.

The present disclosure provides an image processing system in which, when a sink device such as a DTV performs bidirectional communication with a source device such as a BD player through a single communication line, the two devices can be electrically disconnected from each other in an idle state, an image display apparatus, an electronic device, a power-saving interface, and a driving method of an image display apparatus.

According to an aspect of an exemplary embodiment, an image processing system in which an image display apparatus and a peripheral device perform bidirectional communication through a single communication line includes a peripheral device connected to a first side of the communication line, the peripheral device being configured to provide a first signal to the communication line; and an image display apparatus connected to a second side of the communication line, the image display apparatus being configured to provide a second signal to the communication line, and to selectively allow the communication line to conduct electricity based on a state of at least one from among the first signal and the second signal in order to perform the bidirectional communication.

According to another aspect of an exemplary embodiment, an image display apparatus for performing bidirectional communication with a peripheral device through a single communication line includes a power-saving interface configured to selectively allow the communication line to conduct electricity based on a state of a first signal provided to the power-saving interface; and a controller configured to change the state of the first signal provided to the power-saving interface in order to perform the bidirectional communication.

The power-saving interface may further include: a logic circuit configured to receive a second signal from the peripheral device and the first signal through the communication line; and a switch configured to selectively allow the communication line to conduct electricity according to an output signal outputted from the logic circuit unit based on the state of the first signal.

The logic circuit may further include a NAND circuit.

The power-saving interface may be connected with the peripheral device through at least one from among an I2C line or a CEC line to perform the bidirectional communication.

In response to the state of the first signal being maintained and a state of the second signal being changed, the controller may be further configured to operate in a slave state and to receive the second signal from the peripheral device.

The controller may be further configured to operate in a master state, to transmit the first signal to the peripheral device, and to change the state of the first signal.

The controller may be further configured to change the state of the first signal by changing a power voltage Vcc applied to the communication line to form a discontinuous DC voltage.

According to yet another aspect of an exemplary embodiment, a driving method of an image display apparatus for performing bidirectional communication with a peripheral device through a single communication line includes changing a state of a first signal provided to the communication line; and communicating with the peripheral device by selectively allowing the communication line to conduct electricity based on the changed state of the first signal.

The communicating with the peripheral device may further include: receiving, by a logic circuit, a second signal from the peripheral device and the first signal through the communication line; and selectively allowing, by a switch, the communication line to conduct electricity based on the changed state of the first signal.

The logic circuit may further include a NAND circuit.

The image display apparatus may be connected with the peripheral device through at least one from among an I2C line or a CEC line to perform the bidirectional communication.

The driving method may further include: receiving a second signal from the peripheral device; and operating in a slave state based on the second signal and communicating with the peripheral device.

The changing the state of the first signal may further include operating in a master state to transmit the first signal to the peripheral device and changing the state of the first signal.

The changing the state of the first signal may further include changing a power voltage Vcc applied to the communication line to form a discontinuous DC voltage.

According to a further aspect of an exemplary embodiment, a power-saving interface device connecting an image display apparatus and a peripheral device to perform bidirectional communication through a single communication line includes a logic circuit configured to receive a first signal from the image display apparatus and a second signal from the peripheral device through the communication line and to provide an output signal based on the first signal and the second signal; and a switch configured to, in response to a change in a state of at least one from among the first signal or the second signal, selectively allow the communication line to conduct electricity according to the output signal of the logic circuit unit.

According to a still further aspect of an exemplary embodiment, an electronic device for performing bidirectional communication with a peripheral device through a single communication line includes a power-saving interface configured to selectively allow the communication line to conduct electricity to perform the bidirectional communication; and a controller configured to control the power-saving interface to selectively allow the communication line to conduct electricity by changing a state of a signal provided to the power-saving interface.

According to another aspect of an exemplary embodiment, a power-saving interface device connecting an image display apparatus and a peripheral device using a communication line includes a logic circuit configured to detect a first signal from the image display apparatus through the communication line, to detect a second signal from the peripheral device through the communication line, and to provide an output signal based on the first signal and the second signal; and a switch configured to receive the output signal from the logic circuit, wherein in response to the output signal indicating that both the first signal and the second signal are idle, the switch is configured to disconnect the image display apparatus from the peripheral device on the communication line, and in response to the output signal indicating a change in at least one from among the first signal and the second signal, the switch is configured to connect the image display apparatus to the peripheral device using the communication line.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the present disclosure will be more apparent by describing certain exemplary embodiments of the present disclosure with reference to the accompanying drawings, in which.

Figure 1:
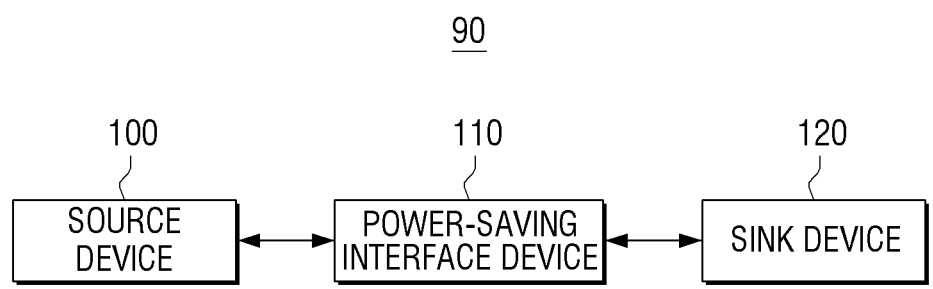
FIG. 1 is a view showing an image processing system according to an exemplary embodiment.
Figure 2:
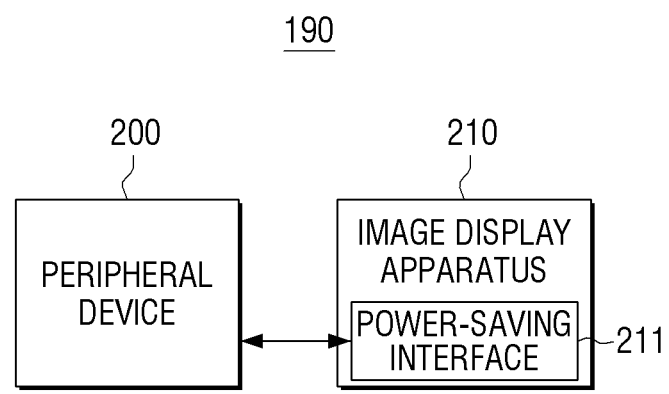
FIG. 2 is a view showing an image processing system according to an exemplary embodiment.
Figure 3:
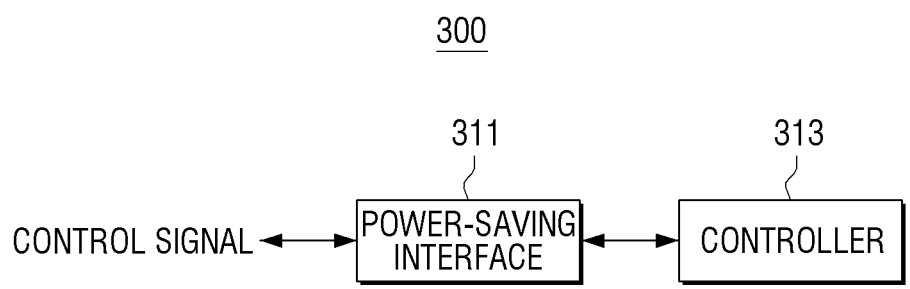
FIG. 3 is a block diagram showing a detailed configuration of a sink device of FIG. 1 and an image display apparatus of FIG. 2, according to an exemplary embodiment.
Figure 6A:
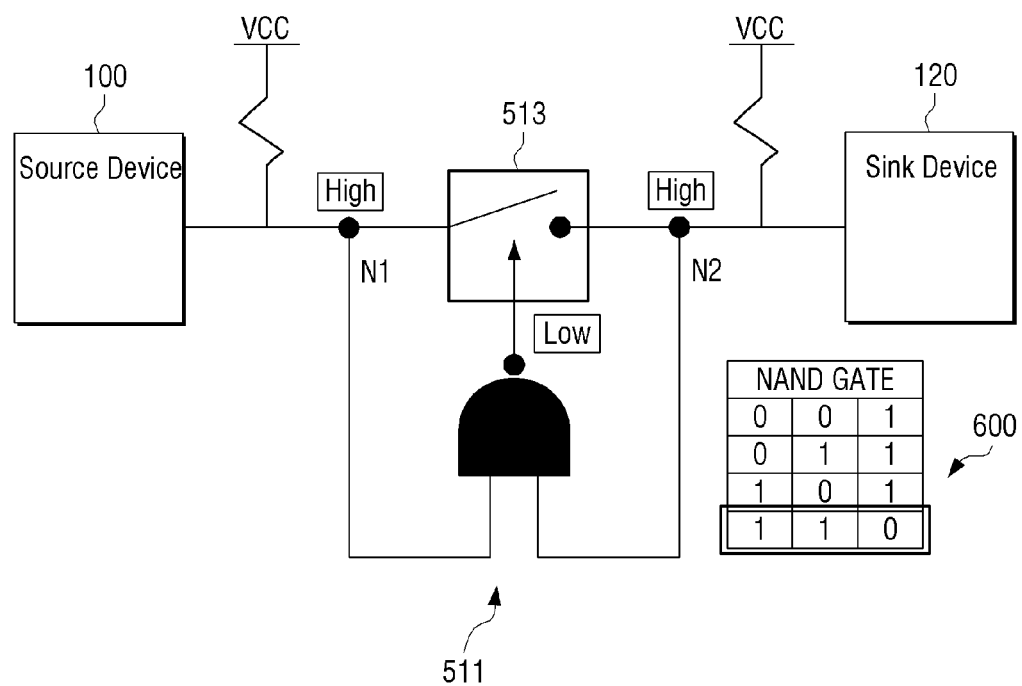
Figure 6B:
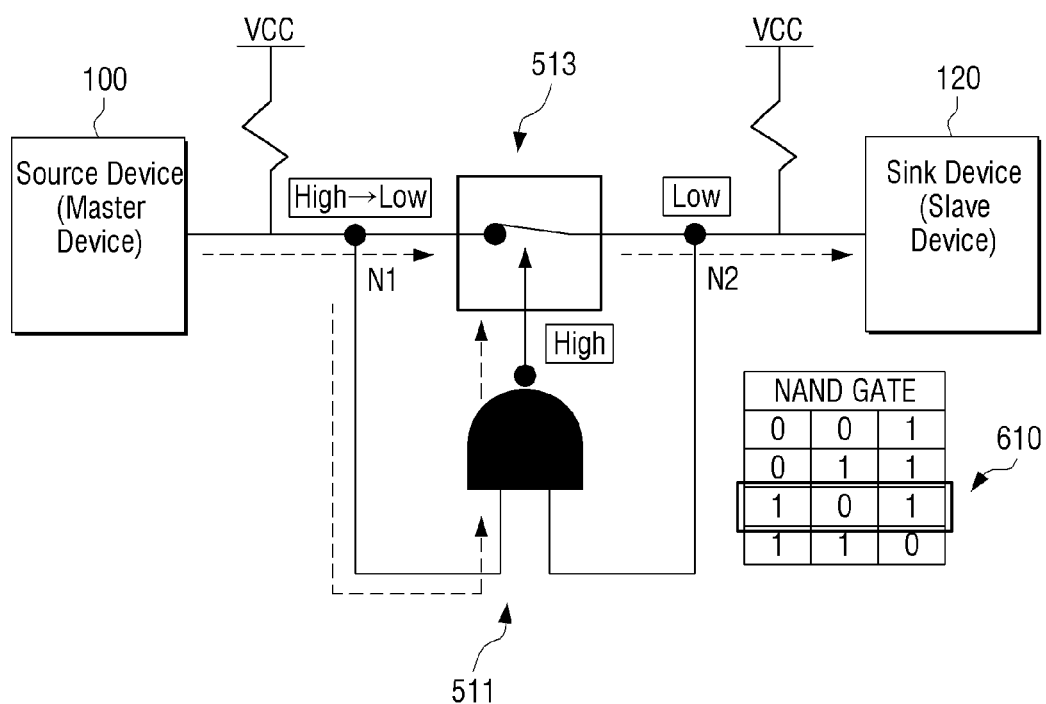
Figure 6C:
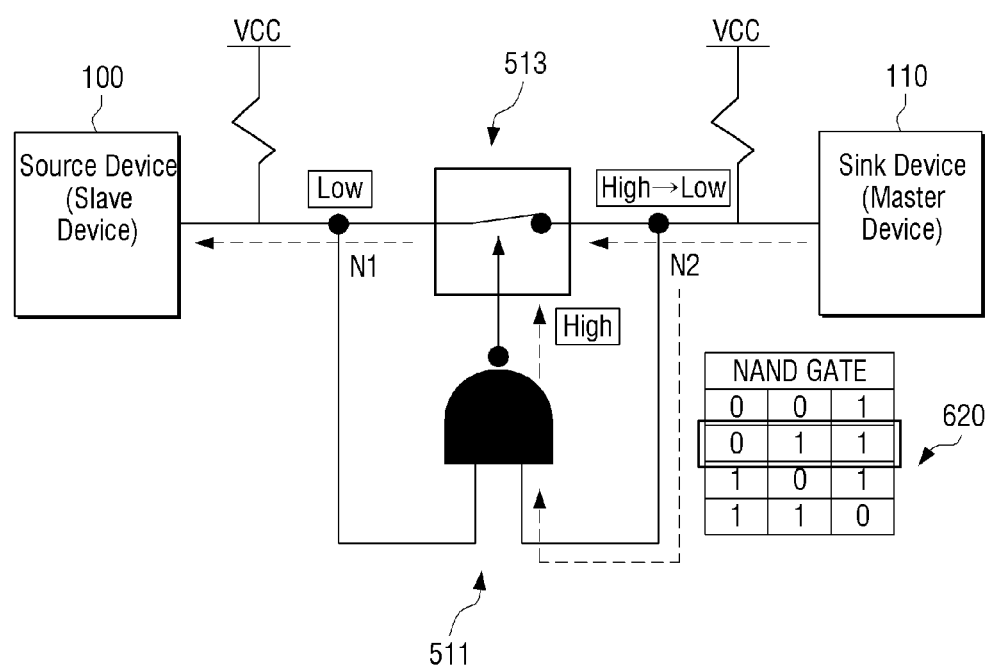
Figure 7:
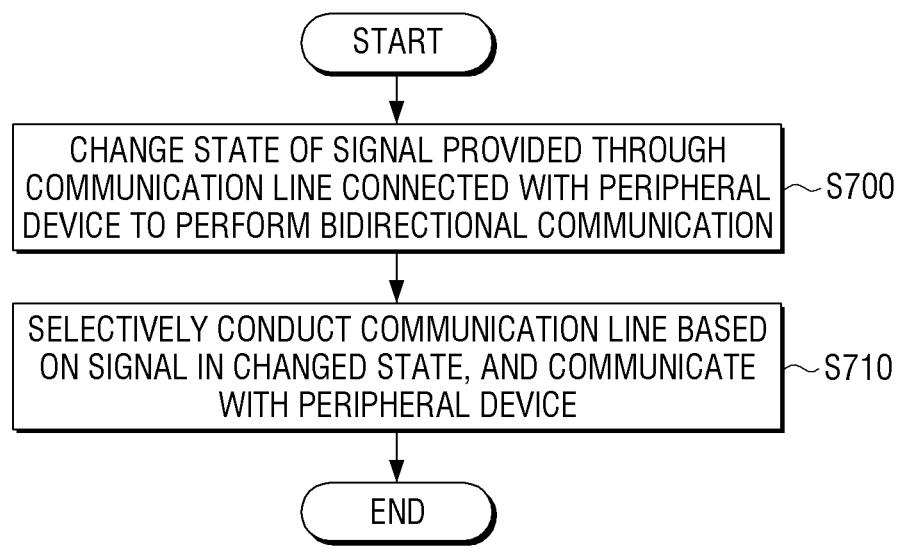

FIG. 6A, FIG. 6B, and FIG. 6C are views to illustrate operations of a power-saving interface device of FIG. 1 and a power-saving interface of FIGS. 2 and 3, according to exemplary embodiments; and FIG. 7 is a view to illustrate a driving process of an image display apparatus according to an exemplary embodiment.

DETAILED DESCRIPTION OF THE EXEMPLARY EMBODIMENTS

Certain exemplary embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments of the present disclosure can be carried out without those specifically defined matters. Also, well-known functions or constructions are not described in detail since they would obscure the exemplary embodiments with unnecessary detail.

FIG. 1 is a view showing an image processing system according to a first exemplary embodiment.

As shown in FIG. 1, the image processing system 90 according to the first exemplary embodiment includes the entirety or part of a source device 100, a power-saving interface device 110, and a sink device 120.

Herein, the term "including the entirety or part" may mean that the image processing system 90 may be configured with the power-saving interface device 110 or the power-saving interface device 110 may be integrated into the source device 100 or the sink device 120 as a part of the elements. In this description, the image processing system 90 includes the entirety for the sake of easy understanding of the present disclosure.

In an exemplary embodiment, the source device 100 may include a variety of devices to provide sources such as video sources and audio sources. For example, in an exemplary embodiment, the source device 100 is a device for providing video and an audio such as a desktop computer, a laptop computer, a tablet PC, a Video Cassette Recorder (VCR), a BD player, a mobile phone, etc., and may be any device which is connected with the sink device 120 through a single communication line and performs bidirectional communication. However, according to an exemplary embodiment, a control signal for bidirectional communication may be generated by changing a state of a power voltage (Vcc) provided through a communication line. Therefore, the source device 100 may adopt a wire manner.

In an exemplary embodiment, power-saving interface device 110 is a standalone device which is independent from the source device 100 and the sink device 120. The power-saving interface device 110 may connect the source device 100 and the sink device 120 through a single communication line, and may include a first connector and a second connector to achieve this. In response to the source device 100 and the sink device 120 being provided with power of 110V or 220V from an external source, and thus being turned on, the power-saving interface device 110 receives power voltages which are generated in the devices source device 100 and the sink device 120. Therefore, the power-saving interface device 110 may be considered as being always connected to a power voltage source even when the source device 100 and the sink device 120 do not communicate with each other, such as in an idle state. However, the communication lines of both devices may be electrically or physically disconnected (or separated) from each other. Accordingly, the source device 100 and the sink device 120 may be completely electrically disconnected from each other. In some exemplary embodiments, such a state of the source device 100 and the sink device 120 may be referred to as "complete insulation" or "isolation."

According to an exemplary embodiment, in the idle state of the source device 100 and the sink device 120, that is, in the state in which the source device 100 and the sink device 120 do not perform communication, in response to the source device 100 operating as a master device to transmit signals and thus changing a state of a power voltage, that is, a signal, the power-saving interface device 110 selectively allows a communication line to conduct electricity based on the signal in the changed state. Then, the sink device 120 operates as a slave device and receives or detects the transmitted signal as a control signal. The reverse may also be true. In other words, in response to the sink device 120 operating as a master device and changing a state of a signal, the power-saving interface device 110 selectively allows a communication line to conduct electricity based on the signal in the changed state, and the source device 100 operates as a slave device and receives the signal.

In an exemplary embodiment, the source device 100 and the sink device 120 are in the idle state, the source device 100 may be a BD player, and a user may insert a disk into the BD player. In this example, the source device 100 may determine that the disk is inserted and inform the sink device 120 of this. For example, the source device 100 may generate a discontinuous DC voltage by switching on or off a DC voltage at a predetermined level provided to the power-saving interface device 110. For example, the source device 100 may provide a pulse voltage. In response to the source device 100 which outputs a DC 14V voltage of a predetermined level providing a pulse voltage swinging between 14V and 0V, the power-saving interface device 110 selectively allows a communication line to conduct electricity in response to the pulse voltage. In addition, the sink device 120 may detect the pulse voltage provided in this way as, for example, a control signal with a binary code "1011." Even when an electric current flows due to the pulse voltage, the sink device 120 may convert the current into a voltage form and detect a control signal. Thereafter, the sink device 120 may perform an operation corresponding to the detected control signal. For example, the sink device 120 may activate relevant function blocks which have been in the idle state in order to prepare video and/or audio processing corresponding to the detected control signal.

In an exemplary embodiment, in response to the sink device 120 generating a control signal by controlling a power voltage outputted to the power-saving interface device 110, the power-saving interface device 110 and the source device 110 may operate in a similar method to the above-described method. As an example, the sink device 120 may be a Set-Top Box (STB) or a DTV and the user may turn off the TV in the middle of watching a movie. In this case, the source device 100 may stop the video and audio and thus may turn off the power under the control of the sink device 120 transmitted from the power-saving interface device 110.

In addition, various operations corresponding to bit information of the mutually transmitted control signals may be performed. However, a detailed description of the various operations is omitted because examples of a manner in which control signals may be transmitted between source device 100 and the sink device 120 has been described above.

The sink device 120 may include a variety of devices such as an STB, a DTV, etc. The sink device 120 may be a device which receives a video and audio from the source device 100. However, although the term "sink" implies that the sink device 120 operates as a slave device, the sink device 120 is not limited to receiving video and audio in the exemplary embodiments.

In addition, as in the source device 100 described above, the sink device 120 may provide a power voltage to the power-saving interface device 100 when being turned on by external power. In an exemplary embodiment, sink device 120 in the idle state, which does not perform communication, provides the power voltage to the power-saving interface device 110, but is completely electrically disconnected from the source device 100 connected through a communication line by the power-saving interface device 110. In this state, in response to the sink device 120 operating as a master device to transmit signals, the sink device 120 may change the form of the power voltage provided. In an exemplary embodiment, the sink device 120 changes the DC voltage of the predetermined level continuously provided to a discontinuous DC voltage, that is, a pulse voltage. The type of the pulse voltage changed in this way may be changed in various forms. This may be a kind of control information and thus may be changed in various forms by a system designer.

According to exemplary embodiments, the source device 100 and the sink device 120 are completely electrically disconnected from each other in the idle state, so that power consumption (or a leakage current) can be reduced. In addition, as will be described below, the power-saving interface device 100 can be simply configured, so that a manufacturing cost can be reduced.

FIG. 2 is a view showing an example of an image processing system according to an exemplary embodiment.

As shown in FIG. 2, the image processing system 190 according to an exemplary embodiment may include a peripheral device 200 and an image display apparatus 210 which includes a power-saving interface 211.

In the example image processing system 190 of FIG. 2, an image display apparatus 210 such as a DTV may correspond to the sink device 120 of FIG. 1, and the power-saving interface 211 corresponding to the standalone power-saving interface device 110 shown in FIG. 1 may be configured as a part of the elements of the image display apparatus 210.

In FIG. 2, the peripheral device 200 may include a variety of devices connected to the image display apparatus 210. For example, the peripheral device 200 may include a VCR, a BD player, a laptop computer, or an audio device providing an audio. The peripheral device 200 may be connected with the image display apparatus 210 through an HDMI cable, for example. According to an exemplary embodiment, the HDMI cable may include a CEC line. The peripheral device 200 and the image display apparatus 210 may perform bidirectional communication through the HDMI CEC line.

The peripheral device 200, the power-saving interface 211, and the image display apparatus 210 of the image processing system 190 according to an exemplary embodiment may be similar to the source device 100, the power-saving interface device 110, and the sink device 120 of FIG. 1, and thus some redundant explanation is omitted.

FIG. 3 is a block diagram showing a detailed configuration of a device 300. In some exemplary embodiments, device 300 may correspond to sink device 120 of FIG. 1 or the image display apparatus 210 of FIG. 2.

Referring to FIG. 3 with FIG. 2 for convenience of explanation, the device 300 according to an exemplary embodiment includes a power-saving interface 311 and a controller 313.

Herein, the power-saving interface 311 may be similar to the power-saving interface device 110 and the power-saving interface 211. However, since the power-saving interface 311 is configured in the image display apparatus 300, the power-saving interface 311 may be operated under the control of the controller 313.

In some exemplary embodiments, the power-saving interface 311 may be selectively connected with the peripheral device 200 under switching control of a power voltage which is provided by the controller 313 under on/off switching control of the controller 313, or of a power voltage which is provided separately from the controller 313. Herein, the device 300 may be considered as communicating with the peripheral device 200 based on the selective connecting operation.

In addition, in response to a control signal, for example, a pulse voltage, being received from the peripheral device 200, the power-saving interface 311 may be operated on/off to selectively allow a communication line to conduct electricity. A control signal based on such selective conducting may be provided to the controller 313.

In some exemplary embodiments, controller 313 performs a control operation by changing the form of the power voltage provided to the power-saving interface 311. To achieve this, the controller 313 changes the DC voltage of the predetermined level continuously provided to a discontinuous DC voltage. To achieve this, the controller 313 may connect a switching element between a power voltage source and the power-saving interface 311, for example, and may control the on/off state of the connected switching element. The above-described process is applied to the case where the controller 313 is operated as a master device. In an exemplary embodiment, only the switching element is illustrated for the sake of easy understanding, but the switching element may be changed in various forms.

In some exemplary embodiments, the controller 313 may be operated as a slave device to receive signals. In this case, in response to, for example, a signal of a pulse voltage being received from a peripheral device 200, the controller 313 detects this signal and determines the detected signal. For example, the controller 313 may determine control information of the inputted signal by detecting the pulse voltage received to the power-saving interface 311 or a relevant electric current. In addition, the controller 313 may control various function blocks provided therein or perform an additional operation with the peripheral device 200 based on the result of the determination. To achieve this, the controller 313 may additionally identify operation information of the operation corresponding to the detected control information. This may be achieved by retrieving information stored in a storage provided separately from the controller 313 or searching a registry which is implemented in the controller 313 in a software level.

Figure 4:
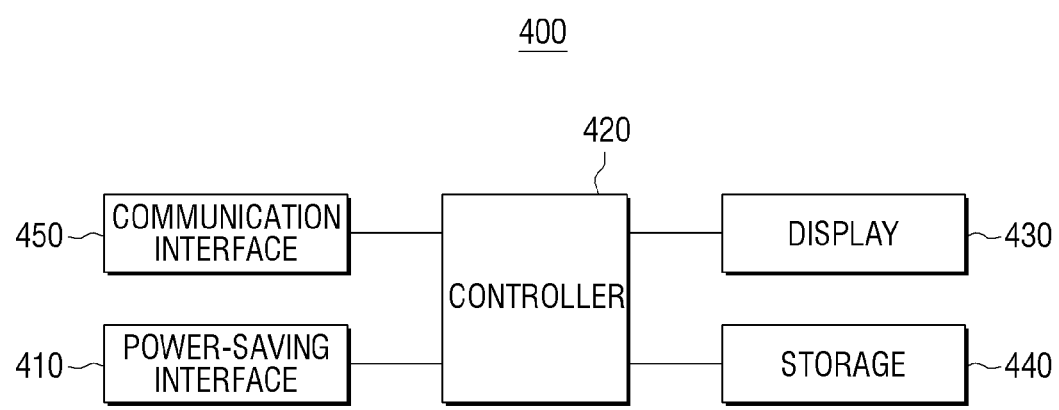
FIG. 4 is a block diagram showing another detailed configuration of a sink device of FIG. 1 and an image display apparatus of FIG. 2, according to an exemplary embodiment.

FIG. 4 is a block diagram showing an example of a device 400. In some exemplary embodiments, device 400 may correspond to the sink device 120 of FIG. 1 or the image display apparatus 210 of FIG. 2.

Referring to FIG. 4, the device 400 according to an exemplary embodiment includes a part or entirety of a communication interface 450, a power-saving interface 410, a controller 420, a display 430, and a storage 440, and may further include a sound output unit.

Herein, the term "including part or entirety" may have the same meaning as described above.

The communication interface 450 may include a communication module to perform wire or wireless communication. For example, the communication interface 450 may include a wireless module to communicate with an adjacent Access Point (AP) wirelessly, for example, through WiFi, and may include a wire module to connect to the Internet. The two modules may conform to the different communication standards. In addition, the communication interface 450 may further include a tuner or a demodulator as a wire module to receive a broadcast program.

The power-saving interface 410 may be connected with the peripheral device 200 such as a BD player through the HDMI cable. Because the power-saving interface 410 may be similar to the power-saving interface 311, power-saving interface 211, or power-saving interface device 110, the power-saving interface 410 will not be explained below.

The controller 420 may control the overall operations of the communication interface 450, the power-saving interface 410, the display 430, and the storage 440 of the device 400. For example, in response to a user's request, the controller 420 may control the communication interface 450 to receive a broadcast program and display the broadcast program on the display 430. A variety of data processed in this process may be stored in the storage 440.

In addition, the controller 420 may perform bidirectional communication with the peripheral device 200 through the power-saving interface 410. For example, in response to a control command being inputted from the peripheral device 200 through the power-saving interface 410, the controller 420 may perform various operations according to the control command. For example, in response to the peripheral device 200 being a BD player and a signal indicating that a disk is inserted being received, the controller 420 may change the display 430 from a power-saving state to an activation state.

The display 430 may include a liquid crystal panel, a Light Emitting Diode (LED), and an Organic LED (OLED) panel, and display an image under the control of the controller 420. In addition, in response to the device 400 being in the idle state, the display 430 may be operated in a standby mode to reduce power consumption. In addition, in response to a request to provide an image to the user being received from the peripheral device 200, the display 430 may change the standby mode to the activation mode under the control of the controller 420.

The storage 440 may store various data which is processed in the controller 420 and output stored data according to a request of the controller 420. The storage 440 may be implemented by using a Random Access Memory (RAM), but is not limited to this. For example, in response to a broadcast signal received through the communication interface 450 being divided into video data, audio data, and additional information, the controller 420 may store the additional information in the storage 440 and then read out it to use again. For example, in response to subtitle information being stored, the controller 420 may combine the subtitle with the video data and display the subtitle when displaying the image on the display 430.

Figure 5:
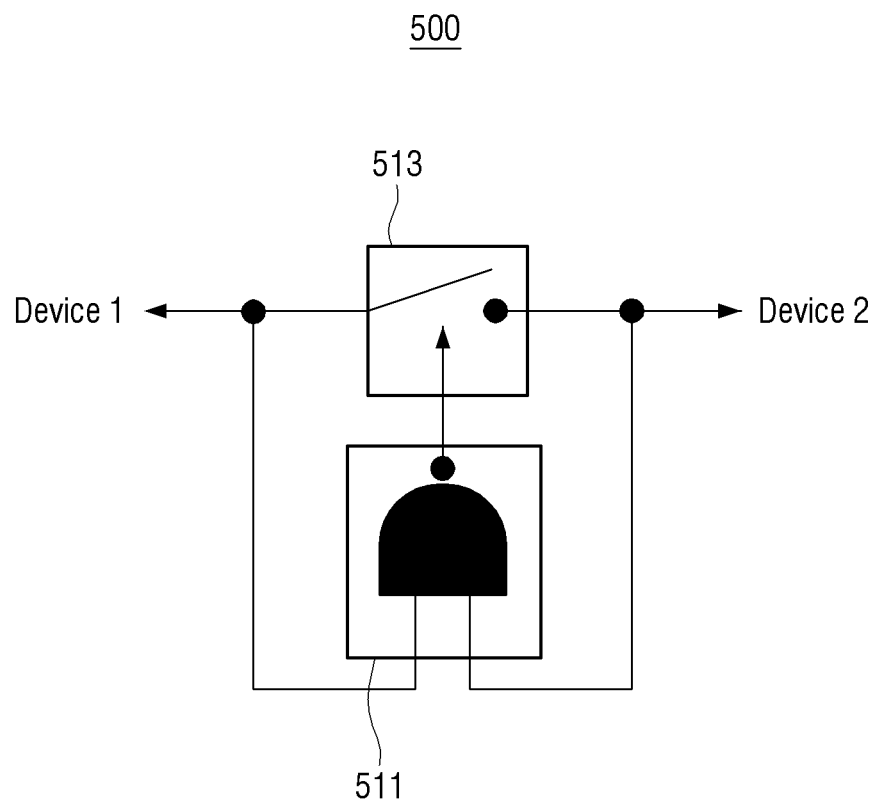
FIG. 5 is a view to illustrate a detailed configuration of a power-saving interface device of FIG. 1 and a power-saving interface of FIGS. 2 and 3, according to an exemplary embodiment.

FIG. 5 is shows an example of a detailed configuration of power-saving interface 500, which may correspond to the power-saving interface device 110 of FIG. 1, or the power-saving interface 211 of FIG. 2 and power-saving interface 311 of FIG. 3, and FIG. 6A, FIG. 6B, and FIG. 6C are illustrate examples of the operation of the power-saving interface 500.

Referring to FIG. 5, the power-saving interface 500 according to an exemplary embodiment includes a logic circuit unit 511 and a switching unit 513.

The logic circuit unit 511 may include a NAND gate. According to an exemplary embodiment, SN7400 of TTL series may be used to configure the NAND gate. That is, one of the four NAND gates configured in the IC may be used. In some exemplary embodiments, the logic circuit unit 511 may be configured by combining an AND gate and an inverter. The logic circuit unit 511 may be changed in various forms to substantially control the switching unit 513, and thus is not limited to the NAND gate in the exemplary embodiment. The logic circuit unit 511 may be configured to provide an output signal in response to two input signals.

The NAND gate of the logic circuit unit 511 may have an input terminal formed at one side thereof and connected to Device 1, which may be for example the source device 100 of FIG. 1. Accordingly, in response to Device 1 being in the idle state, the NAND gate may receive a DC power voltage regularly or continuously provided. In addition, the NAND gate may have an input terminal formed at the other side thereof and connected to Device 2, which may be for example the sink device 120 of FIG. 1. Accordingly, in response to Device 2 being in the idle state, that is, not performing communication, the NAND gate may receive a DC power voltage maintaining a regular level. Accordingly, the NAND gate of the logic circuit unit 511 may output a low signal in response to a high voltage provided through the two input terminals, and thus does not turn on the switching unit 513. Herein, the "DC power voltage regularly or continuously provided" may refer to a voltage except for a voltage at opposite ends of a resistor (see FIG. 6A, FIG. 6B, and FIG. 6C) connected to a power voltage source. In addition, the resistor may be configured as an element of the power-saving interface device 110, but is not limited to this, and may be configured as an element of Device 1 or Device 2.

In some exemplary embodiments, in response to the form of the power voltage provided by Device 1 or Device 2 being changed, the NAND gate of the logic circuit unit 511 selectively allows the switching unit 51 to conduct electricity to control Devices 1 and 2 to perform bidirectional communication. According to an exemplary embodiment, Device 1 or Device 2 transmits a control command to the other device by the selective conducting operation of the switching unit 513.

The switching unit 513 may have one terminal connected to Device 1 and commonly connected to one input terminal of the NAND gate of the logic circuit unit 511. In addition, the switching unit 513 may have the other terminal connected to Device 2 and commonly connected to the other input terminal of the NAND gate of the logic circuit unit 511. According to an exemplary embodiment, the switching unit 513 may configure a switching element simply using a TFT element. Accordingly, one terminal may be a source terminal and the other terminal may be a drain terminal, and a gate terminal may be connected to the output terminal of the NAND gate. In an exemplary embodiment, the switching unit 513 may be configured by other types of switching elements in addition to the TFT element, and is not limited to a specific element.

The power-saving interface device 500 according to the above-described configuration according to exemplary embodiments may be operated as in FIG. 6A, FIG. 6B, and FIG. 6C.

Referring to FIG. 6A, FIG. 6B, and FIG. 6C, with FIG. 1 for convenience of explanation, the power-saving interface device 500 according to an exemplary embodiment maintains the switching unit 513 in the off state in response to the source device 100 and the sink device 120 being in the idle state, that is, not communicating with each other, as shown in FIG. 6A. In other words, since the NAND gate of the logic circuit unit 511 outputs the low signal in response to two inputs being in the high state as shown in a logic table 600 shown in FIG. 6A, the switching unit 513 may be maintained in the off state.

In this state, in response to the source device 100 being operated as a master device and transmitting a signal, that is, the form of the power voltage provided from the source device 100 to node 1 (N1) being changed from a high level to a low level, the switching unit 513 is turned on by an output signal of the logic circuit unit 511 based on a logic table 610 of FIG. 6B, and the signal in the low state, more exactly, the signal swinging between the high level and the low level, may be transmitted to the sink device 120 which is operated as a slave device. Based on the signal swinging between the high level and the low level, it may be determined that the source device 100 and the sink device 200 communicate with each other. For example, when the system designer sets a specific operation to be performed in response to a binary code "1001" swinging between the high level and the low level, the sink device 120 may recognize this and perform a predetermined operation.

In some exemplary embodiments, in response to the source device 100 maintaining the power voltage provided to the power-saving interface device 500, and the sink device 120 being operated as a master device and transmitting signal, that is, in response to the form of the power voltage provided to the power-saving interface device 500 being changed, the switching unit 513 may be selectively turned on in response to a high output signal of the logic circuit unit 511 based on a logic table 620 shown in FIG. 6C. Herein, the turning-on operation may correspond to an operation of selectively allowing the source device 100 and the sink device 120 to conduct electricity. Accordingly, the sink device 120 may transmit a control command to the source device 100 and perform communication.

As described above, the source device 100 and the sink device 120 according to an exemplary embodiment may be completely electrically disconnected from each other by the power-saving interface device 500 which may be configured simply by the logic gate and the switching element, so that power consumption can be reduced and furthermore a manufacturing cost can be reduced.

FIG. 7 is a view to illustrate a driving process of an image display apparatus according to an exemplary embodiment.

Referring to FIG. 7 and using elements of FIG. 2 for convenience of explanation, the image display apparatus 210 according to an exemplary embodiment changes a state of a signal provided to a communication line connected with the peripheral device 200 to perform bidirectional communication (S700). Herein, the term "signal" may be a power voltage (or a DC voltage of a predetermined level having a power voltage changed), and the term "changing the state of the signal" may refer to changing a DC voltage of a predetermined level continuously provided to a discontinuous DC voltage of a pulse form. More specifically, because the DC voltage of the predetermined level may be always applied to the communication line, this term may imply that the source device 100 or sink device 120 of FIG. 6A may be controlled by switching to shut off the voltage, that is, enter the low state. Herein, one terminal of the switching element controlled by switching may be connected to the communication line and the other terminal may be connected to the ground, and the on/off state of the gate terminal may be controlled by a CPU, for example.

Next, the image display apparatus 210 may communicate with the peripheral device 200 by selectively allowing the communication line to conduct electricity based on the changed state of the signal (S710). In other words, in response to the image display apparatus 210 providing the pulse voltage as a control signal, the peripheral device 200 receives the pulse voltage and performs an operation corresponding to the control signal.

With reference to FIG. 7, the operation has been described from the perspective of the image display apparatus 210. However, the operation can be applied to the peripheral device 200 of FIG. 2, and the source device 100 or sink device 120 of FIG. 1, as well as device 300 and device 400, and thus the above-described operation is not limited to the image display apparatus 210.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An image display apparatus for performing bidirectional communication with a peripheral device through a single communication line, the image display apparatus comprising:
   a power-saving interface configured to selectively allow the image display apparatus to connect the single communication line with electricity based on a state of a first signal provided to the power-saving interface; and
   a controller configured to change the state of the first signal provided to the power-saving interface in order to perform the bidirectional communication,
   wherein the power-saving interface further comprises:
      a logic circuit configured to receive a second signal from the peripheral device and the first signal through the communication line, and
      a switch configured to selectively allow the image display apparatus to connect the single communication line with electricity according to an output signal outputted from the logic circuit based on the state of the first signal.

2. The image display apparatus of claim 1, wherein the logic circuit comprises a NAND circuit.

3. The image display apparatus of claim 1, wherein the single communication line is an I2C line or a CEC line.

4. The image display apparatus of claim 1, wherein, in response to the state of the first signal being maintained and a state of the second signal being changed, the controller is configured to operate in a slave state and to receive the second signal from the peripheral device.

5. The image display apparatus of claim 1, wherein the controller is configured to operate in a master state, to transmit the first signal to the peripheral device, and to change the state of the first signal.

6. The image display apparatus of claim 1, wherein the controller is configured to change the state of the first signal by changing a power voltage Vcc applied to the communication line to form a discontinuous DC voltage.

7. A driving method of an image display apparatus for performing bidirectional communication with a peripheral device through a single communication line, the method comprising:
   changing a state of a first signal provided to the communication line; and
   communicating with the peripheral device by selectively allowing the image display apparatus to connect the single communication line with electricity based on the changed state of the first signal,
   wherein the communicating with the peripheral device further comprises:
      receiving, by a logic circuit, a second signal from the peripheral device and the first signal through the single communication line; and
      selectively allowing, by a switch, the image display apparatus to connect the single communication line with electricity based on the changed state of the first signal.

8. The driving method of claim 7, wherein the logic circuit comprises a NAND circuit.

9. The driving method of claim 7, wherein the image display apparatus is connected with the peripheral device through at least one from among an I2C line or a CEC line to perform the bidirectional communication.

10. The driving method of claim 7, further comprising:
    receiving a second signal from the peripheral device; and
    operating in a slave state based on the second signal and communicating with the peripheral device.

11. The driving method of claim 7, wherein the changing the state of the first signal further comprises operating in a master state to transmit the first signal to the peripheral device and changing the state of the first signal.

12. The driving method of claim 7, wherein the changing the state of the first signal comprises changing a power voltage Vcc applied to the communication line to form a discontinuous DC voltage.

13. A power-saving interface device connecting an image display apparatus and a peripheral device to perform bidirectional communication through a single communication line, the power-saving interface device comprising:
   a logic circuit configured to receive a first signal from the image display apparatus and a second signal from the peripheral device through the communication line and to provide an output signal based on the first signal and the second signal; and
   a switch configured to, in response to a change in a state of at least one from among the first signal or the second signal, selectively allow the communication line to conduct electricity according to the output signal of the logic circuit.

* * * * *